United States Patent
McKittrick et al.

(10) Patent No.: US 10,599,188 B1
(45) Date of Patent: Mar. 24, 2020

(54) RETAINING MECHANISM FOR COUPLING A DISPLAY ASSEMBLY WITH A DISPLAY HOUSING

(71) Applicant: Dell Products L.P., Round Rock, TX (US)

(72) Inventors: Allen Brian McKittrick, Cedar Park, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/389,252

(22) Filed: Apr. 19, 2019

(51) Int. Cl.
*G06F 1/16* (2006.01)

(52) U.S. Cl.
CPC .......... *G06F 1/1681* (2013.01); *G06F 1/1616* (2013.01); *G06F 1/1632* (2013.01); *G06F 1/1654* (2013.01)

(58) Field of Classification Search
CPC ............................. G06F 1/1632; G06F 1/1654
See application file for complete search history.

(56) References Cited

U.S. PATENT DOCUMENTS

| | | | | |
|---|---|---|---|---|
| 5,262,759 A * | 11/1993 | Moriconi | .............. | G06F 1/1616 361/679.29 |
| 5,986,726 A * | 11/1999 | Murai | ............... | G02F 1/133308 349/59 |
| 6,430,038 B1 * | 8/2002 | Helot | .................... | G06F 1/1616 248/917 |
| 8,467,178 B2 * | 6/2013 | Probst | .................. | G06F 1/1616 345/168 |
| 8,573,394 B2 * | 11/2013 | Ahee | ..................... | G06F 1/1626 206/320 |
| 8,837,131 B1 * | 9/2014 | Colby | ................... | G06F 1/1667 361/679.06 |
| 9,013,863 B2 * | 4/2015 | Hsu | ....................... | H05K 7/1401 206/320 |
| 9,363,907 B2 * | 6/2016 | Hondo | ................. | H05K 5/0221 |
| 9,572,270 B2 * | 2/2017 | Wang | ........................ | G09F 9/33 |
| 2003/0137584 A1 * | 7/2003 | Norvell | .............. | B60R 11/0235 348/61 |
| 2006/0109388 A1 * | 5/2006 | Sanders | .................. | B60R 11/02 348/837 |
| 2009/0201433 A1 * | 8/2009 | Hayashi | .............. | B60R 11/0235 348/837 |
| 2010/0053882 A1 * | 3/2010 | Hayashi | .................. | B60R 11/02 |
| 2010/0172081 A1 * | 7/2010 | Tian | ...................... | G06F 1/1626 361/679.29 |

(Continued)

*Primary Examiner* — Adrian S Wilson
(74) *Attorney, Agent, or Firm* — Baker Botts L.L.P.

(57) ABSTRACT

An information handling system, comprising: a display housing; a display assembly including a bracket, the bracket having tabs extending therefrom, the display assembly configured to be retained by the display housing; a retaining mechanism including a pin having tabs extending radially from the pin, the retaining mechanism configured to: when positioned in a second state with respect to the bracket, engage the tabs of bracket with the tabs of the pin to couple the display assembly to the display housing; and when positioned in a first state with respect to the bracket, disengage the tabs of the bracket from the tabs of the pin to decouple the display assembly from the display housing.

15 Claims, 7 Drawing Sheets

(56) References Cited

U.S. PATENT DOCUMENTS

| | | | |
|---|---|---|---|
| 2014/0063758 A1* | 3/2014 | Lin | G06F 1/1647 361/752 |
| 2014/0092532 A1* | 4/2014 | Kole | H04M 1/0249 361/679.01 |
| 2017/0017107 A1* | 1/2017 | Schwager | G02F 1/133308 |

* cited by examiner

RETAINING MECHANISM FOR COUPLING A DISPLAY ASSEMBLY WITH A DISPLAY HOUSING

BACKGROUND

Field of the Disclosure

The disclosure relates generally to information handling systems, and specifically, a retaining mechanism for coupling a display assembly with a display housing of an information handling system, including a method of such coupling.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Edgeless (or infinity) border designs are becoming more popular on portable computing devices such as laptop computing devices. Display technologies can make it possible to reduce the bottom border of a display housing of the computing device to the extent that the display assembly (cover glass, transparent polymer, or polarizer) can no longer be assembled without interfering with a hinge assembly of the computing device. This may result in artificially growing the bottom border of the display assembly or adhering the entire back of the display assembly to the display housing (A-cover). This may result in a significant issue for service and cost given the adhesive pull tabs may not be accessible and releasing the display assembly from adhesive often results in permeant damage. Current methods of assembly tow the top edge of the display assembly to interlock the display tabs with the display housing and the bottom edge rotates into position. Current assembly methods only work when the bottom border of the display assembly is large enough to clear the hinge assembly.

SUMMARY

Innovative aspects of the subject matter described in this specification may be embodied in an information handling system, including a display housing; a display assembly including a bracket, the bracket having tabs extending therefrom, the display assembly configured to be retained by the display housing; a retaining mechanism including a pin having tabs extending radially from the pin, the retaining mechanism configured to: when positioned in a second state with respect to the bracket, engage the tabs of bracket with the tabs of the pin to couple the display assembly to the display housing; and when positioned in a first state with respect to the bracket, disengage the tabs of the bracket from the tabs of the pin to decouple the display assembly from the display housing.

These and other embodiments may each optionally include one or more of the following features. For instance, the information handling system further including a first body; a second body; and a hinge assembly connecting the first body to the second body, wherein the first body includes the display housing, the display assembly, and the retaining mechanism, wherein the retaining mechanism is positioned proximate an edge of the first body opposite the hinge assembly. The retaining mechanism is positioned between the display housing and the display assembly. The retaining mechanism further includes an elastic mechanism, the elastic mechanism configured to transition the retaining mechanism to the second state when uncompressed and transition the retaining mechanism to the first state when compressed. The elastic mechanism is a mechanical spring. The elastic mechanism is deformable material. The pin spans a width of the display housing such that: the pin is in the first state when the pin is engaged from a first side of the display housing; and the pin is in the second state when the pin is engaged from a second, opposite side of the display housing. The information handling system further including an additional retaining mechanism.

Innovative aspects of the subject matter described in this specification may be embodied in a method of coupling a display assembly with a display housing of an information handling system, the method comprising: coupling a first end of the display assembly to a first end of the display housing, the first end of the display housing proximate to a hinge assembly of the information handling system; positioning a retaining mechanism in a first state such that tabs that extend radially from a pin of the retaining mechanism are clear of being in superimposition with tabs extending from a bracket of the display assembly; after positioning the retaining mechanism in the first state, rotating the display assembly towards the display housing such that the display assembly is positioned within the display housing; and after rotating the display assembly towards the display housing, positioning the retaining mechanism in a second state such that the tabs of the pin engage the tabs of the bracket to couple the display assembly to the display housing.

These and other embodiments may each optionally include one or more of the following features. For instance, positioning the retaining mechanism in the first state, from the second state, such that the tabs that extend radially from the pin of the retaining mechanism are clear of being in superimposition with the tabs extending from the bracket of the display assembly; after positioning the retaining mechanism in the second state, decoupling the display assembly from the display housing; and after decoupling the display assembly from the display housing, rotating the display assembly away from the display housing such that the display assembly is not positioned within the display housing. The retaining mechanism is positioned proximate to a second end of the display housing, the second end opposite the first end of the display housing. The retaining mechanism is positioned between the display housing and the display assembly. Compressing an elastic mechanism of the retaining mechanism to transition the retaining mechanism to the first state; and decompressing the elastic mechanism of the retaining mechanism to transition the retaining mechanism to the second state. The elastic mechanism is a mechanical spring. The elastic mechanism is deformable material. The pin spans a width of the display housing, the method further comprising engaging the pin at a first side of the display housing to place the pin in the first state; and engaging the pin at a second side of the display housing to place the pin the second state, the second side opposite the first side.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

For information handling systems that push the limit on narrow display borders, it may be beneficial to tow in the display assembly along the top to the bottom and utilize a locking mechanism to secure the top of the display assembly. To assemble, the display assembly can be aligned along the bottom edge of the display housing (under the hinge assembly) and rotated downward into position. Before the display assembly fully seats, a pin can be pressed into a pinhole along the top side edge of the display housing to translate a retaining mechanism to clear the display tabs. Once the display assembly is seated in the display housing, the pin can be released and the retaining mechanism secures the display assembly. To disassemble, the pin can be translated to disengage the retaining mechanism.

This document describes an information handling system that includes a display housing; a display assembly including a bracket, the bracket having tabs extending therefrom, the display assembly configured to be retained by the display housing; a retaining mechanism including a pin having tabs extending radially from the pin, the retaining mechanism configured to: when positioned in a second state with respect to the bracket, engage the tabs of bracket with the tabs of the pin to couple the display assembly to the display housing; and when positioned in a first state with respect to the bracket, disengage the tabs of the bracket from the tabs of the pin to decouple the display assembly from the display housing.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-10 wherein like numbers are used to indicate like and corresponding parts.

Figure 1:
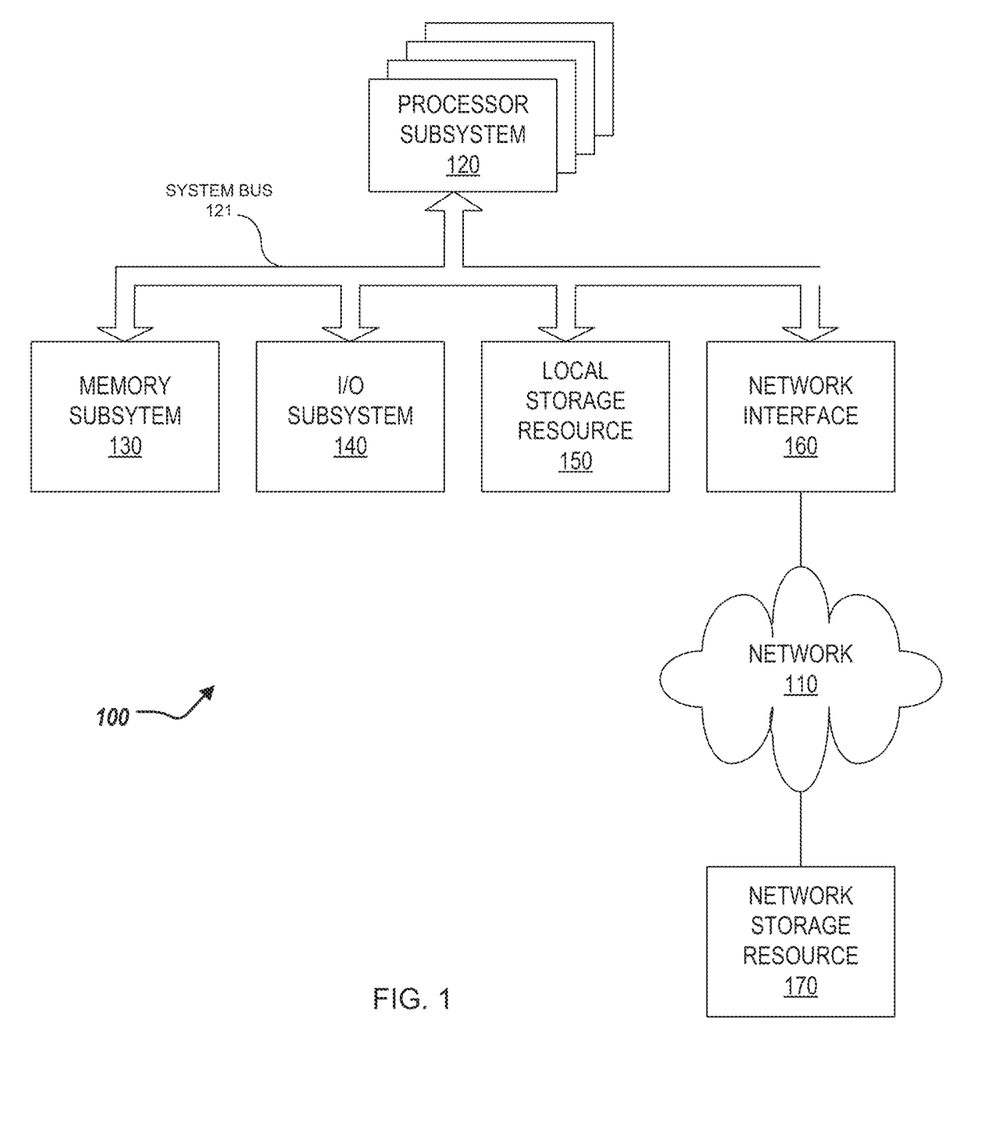
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
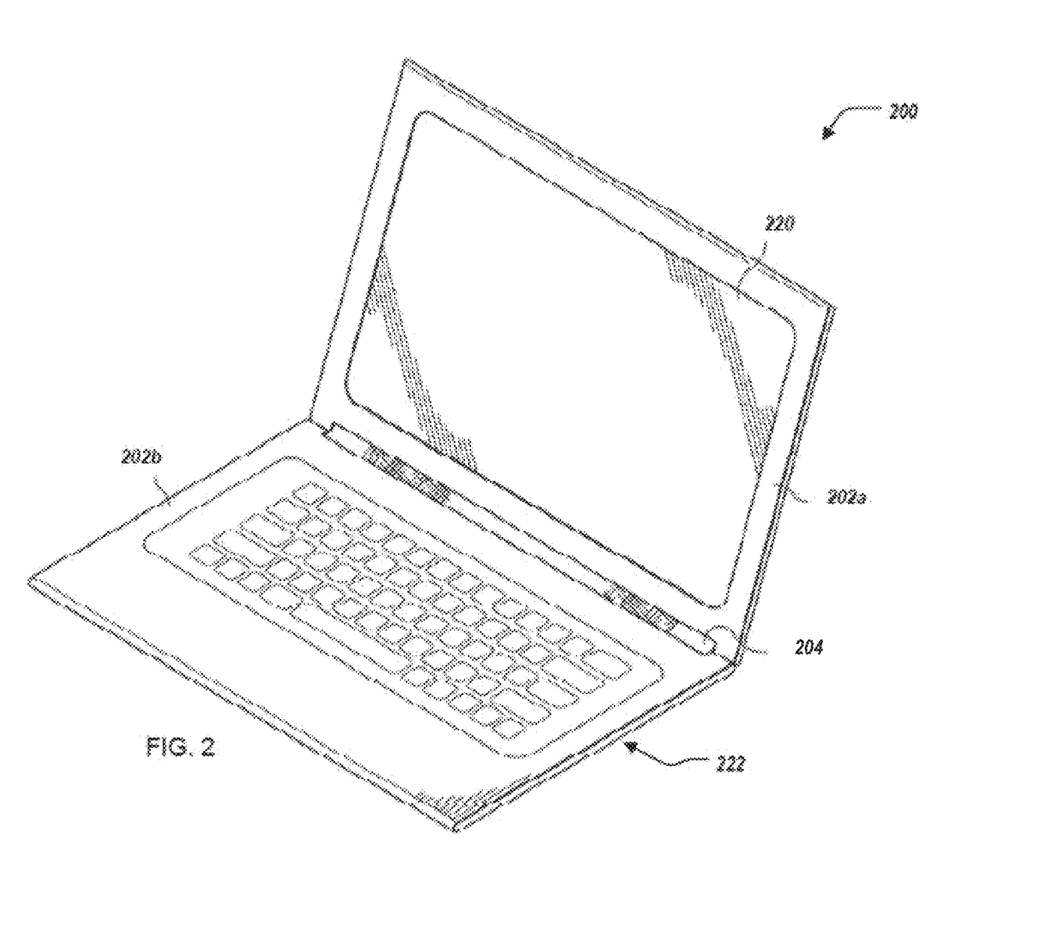
FIG. 2 illustrates a dual-body computing device.

Turning now to FIG. 2, FIG. 2 illustrates a dual-body (or two-body) computing system 200. The computing system 200 can include a first body 202*a* and a second body 202*b* (collectively referred to as bodies 202) and a hinge assembly 204 connecting the first body 202*a* to the second body 202*b*. In some examples, the computing system 200 can be similar to the information handling system 100 of FIG. 1. In some examples, the first body 202*a* can include a display 220 and the second body 202*b* can include a keyboard (not shown) (and typically also include computing components).

Figure 3:
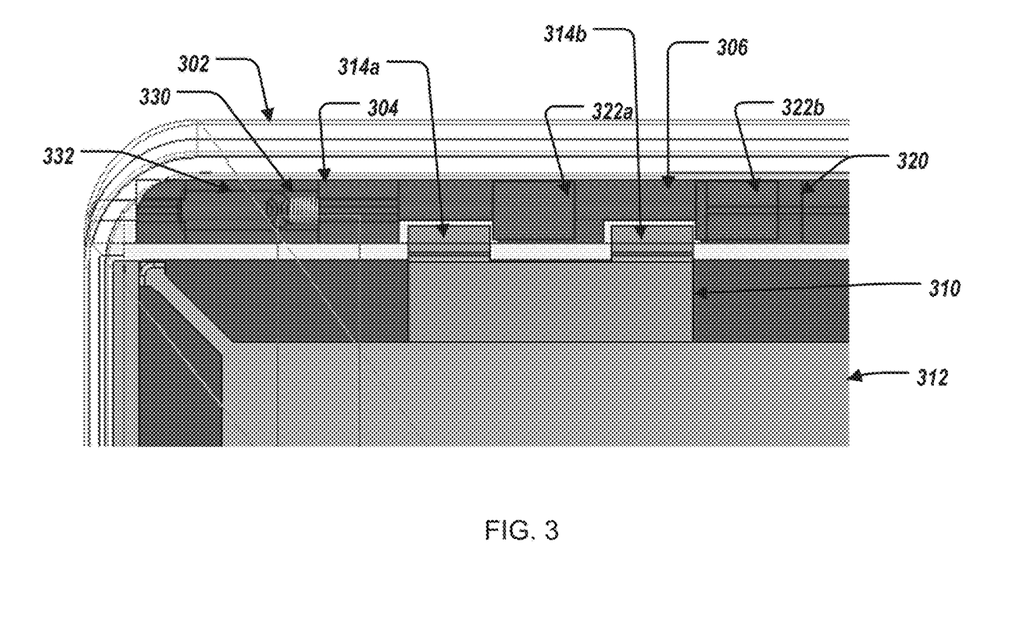
FIG. 3 illustrates a portion of the computing system, including a display housing, a display assembly, and a retaining mechanism.

Referring to FIG. 3, FIG. 3 illustrates a portion of the computing system 200, including a display housing 302, a display assembly 304, and a retaining mechanism 306. In some examples, the first body 202*a* can include the display housing 302, the display assembly 304, and the retaining mechanism 306. The display assembly 304 is configured to be retained by the display housing 302—that is, the display assembly 304 is able to be positioned "within" the display housing 302, described further herein.

The display assembly 304 can include a bracket 310; however, the display assembly 304 can include any number of brackets. The bracket 310 can be coupled to an edge of the display assembly 304, proximate to a display 312 of the display assembly 304. The bracket 310 can be coupled to the display assembly 304 using any coupling means, such as fasteners, or adhesive. The bracket 310 can include a first tab 314a and a second tab 314b (collectively referred to as tabs 314) extending therefrom. However, the bracket 310 can include any number of tabs 314 depending on the application desired. In some examples, the tabs 314 can be deformable. In some examples, the tabs 314 can be flat, and/or have a lead-in chamfer. In some examples, the tabs 314 can range in size from 0.5 millimeters to 20 millimeters.

The retaining mechanism 306 can include a pin 320 having tabs 322a, 322b (collectively referred to as tabs 322) extending radially from the pin 320. The retaining mechanism 306 can include any number of tabs 322 depending on the application desired. In some examples, the tabs 322 are deformable. In some examples, the tabs 322 can be flat, and/or have a lead-in chamfer. In some examples, the tabs 322 can range in size from 0.5 millimeters to 20 millimeters. In some examples, the retaining mechanism 306 can be coupled to the display housing 302. That is, at least a portion of the retaining mechanism 306 can be moveably positioned within a holding bracket (not shown) that is coupled to the display housing 302.

The retaining mechanism 306 can further include an elastic mechanism, such as a mechanical spring 330. The spring 330 can be positioned around the pin 320 and proximate to a first end 332 of the pin 320. In some examples, the elastic mechanism can include a deformable (or compressible) material, such as a foam type material, pads, or elastomers. The deformable (or compressible material) would return to it's original (undeformed or uncompressed) state after deforming/compressing. In some examples, the elastic mechanism can be a plunger-type mechanism, a muscle wire, or an inverted spring.

In some examples, the retaining mechanism 306 can be positioned proximate an edge of the first body 202a, the edge opposite the hinge assembly. In other words, the retaining mechanism 306 can be positioned at a "top" of the first body 202a as viewed from a perspective of a user using the computing system 200. In some examples, the retaining mechanism 306 is positioned between the display housing 302 and the display assembly 304. For example, when the display 312 of the display assembly 304 includes a light-emitting diode (LED) or organic light-emitting diode (OLED) based technology, the retaining mechanism can be positioned between the display housing 302 and the display assembly 304. In some examples, when the display housing 302 can include a plastic-based form factor.

Figure 4:
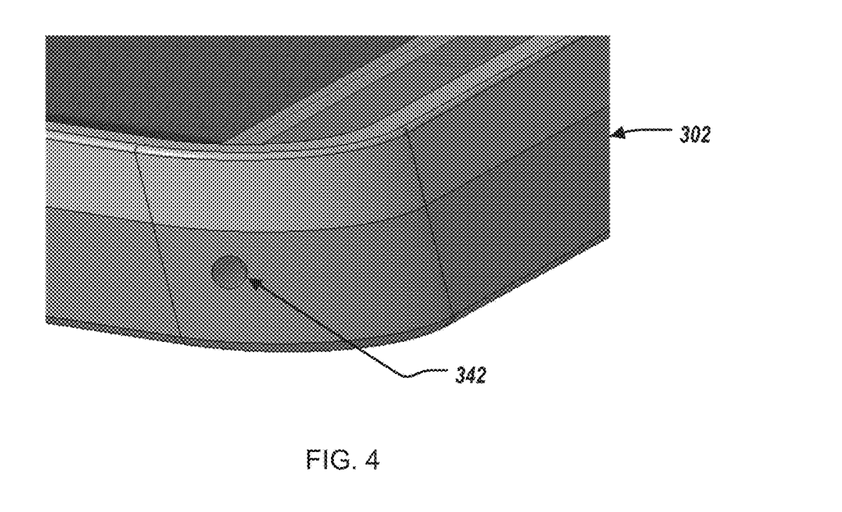
FIG. 4 illustrates the display housing including a pinhole for access to the retaining mechanism.

In some examples, the display housing 302 includes a pinhole 342 for access to the retaining mechanism 306, as shown in FIG. 4. For example, the pin hole 342 can facilitate adjusting positional states of the retaining mechanism 306, described further herein.

To that end, the display assembly 304 can be coupled to the display housing 302. In short, the retaining mechanism 306 is configured to change positional states with respect to the bracket 310 to facilitate i) positioning of the display assembly 304 within the display housing 302, ii) coupling of the display assembly 304 with the display housing 302, and iii) decoupling of the display assembly 304 from the display housing 302.

Figure 11:
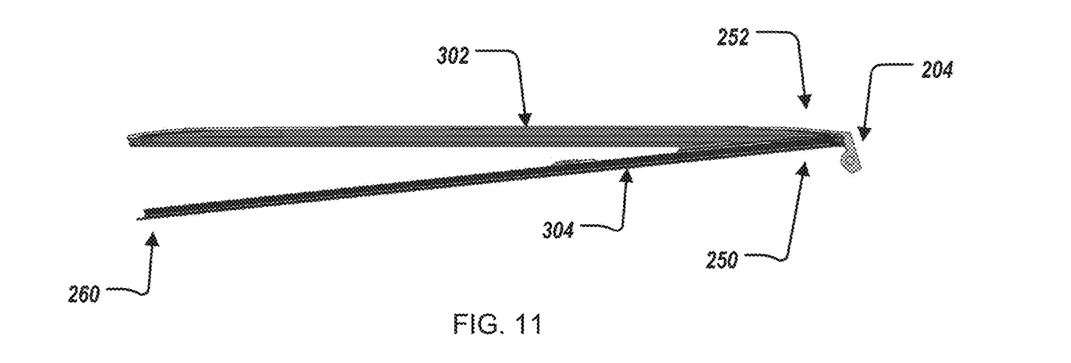
FIG. 11 illustrates an assembled display housing and display assembly.

Referring FIGS. 3 and 11, in some implementations, a first end 250 of the display assembly 304 is coupled to a first end 252 of the display housing 302. In some examples, the first end 250 of the display assembly 304 can include one or more coupling elements ("hooks") (not shown) that can be positioned within one or more coupling cavities ("undercuts") (not shown) of the display housing 302. The coupling elements of the display assembly 304 are able to move and/or rotate within the coupling cavities of the display housing 302 to facilitate coupling of the display assembly 304 with the display housing 302. In some examples, the first end 252 of the display housing 302 is proximate to the hinge assembly 204 of the computing system 200.

By initially coupling the first end 250 of the display assembly 304 with the first end 252 of the display housing 302, the display assembly 304 is "towed in" from the "bottom" of the display housing 302 (as viewed from a perspective of a user using the computing system 200).

After coupling the first end 250 of the display assembly 304 to the first end 252 of the display housing 302, the retaining mechanism 306 is positioned in a first (positional) state with respect to the bracket 310. In some examples, the first state of the retaining mechanism 306 can include the tabs 322 of the pin 320 are clear of being in superimposition with the tabs 314 of the bracket 310. In other words, the first state of the retaining mechanism 306 can include the tabs 322 of the pin 320 not be in superimposition with the tabs 314 of the bracket 310.

In some examples, the elastic mechanism, e.g., the spring 330, can facilitate transitioning the retaining mechanism 306 to the first state. Specifically, the spring 330 can be compressed such that the retaining mechanism 306 is placed in the first state. In some examples, a user can access the retaining mechanism 306 via the pinhole 342. The user can initiate compression of the spring 330 to transition the retaining mechanism 306 to the first state such that the tabs 322 of the pin 320 are clear of being in superimposition with the tabs 314 of the bracket 310. In other words, compression of the spring 330 can shift the retaining mechanism 306 such that the tabs 322 of the pin 320 are clear of being in superimposition with the tabs 314 of the bracket 310.

After positioning the retaining mechanism 306 in the first state, a second end 260 of the display assembly 304 is rotated towards the display housing 302. The second end 260 of the display assembly 304 is rotated towards the display housing 302 about the first end 250 of the display assembly 304. Specifically, the coupling elements of the display assembly 304 within the coupling cavities of the display housing 302 serve as an axis of rotation for rotating the second end 260 of the display assembly 304 towards the display housing 302. That is, the coupling elements of the display assembly 304 are able to rotate within the coupling cavities of the display housing 302 to facilitate rotation of the of the second end 260 of the display assembly 304 towards the display housing 302.

Figure 5:
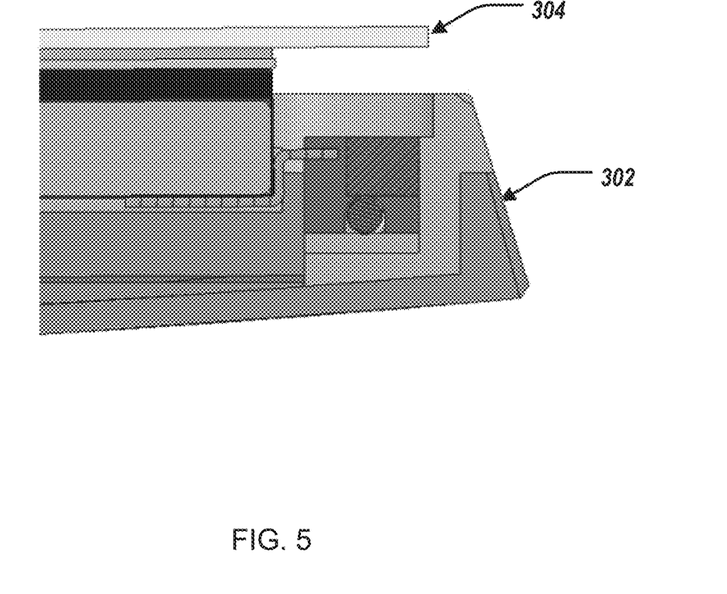
FIGS. 5, 6 illustrates a cross-sectional view of the display housing and the display assembly.

FIG. 5 illustrates a cross-sectional view of the display housing 302 and the display assembly 304 after rotation of the second end 260 of the display assembly 304 towards the display housing 302, but prior to coupling of the display assembly 304 to the display housing 302.

Figure 6:
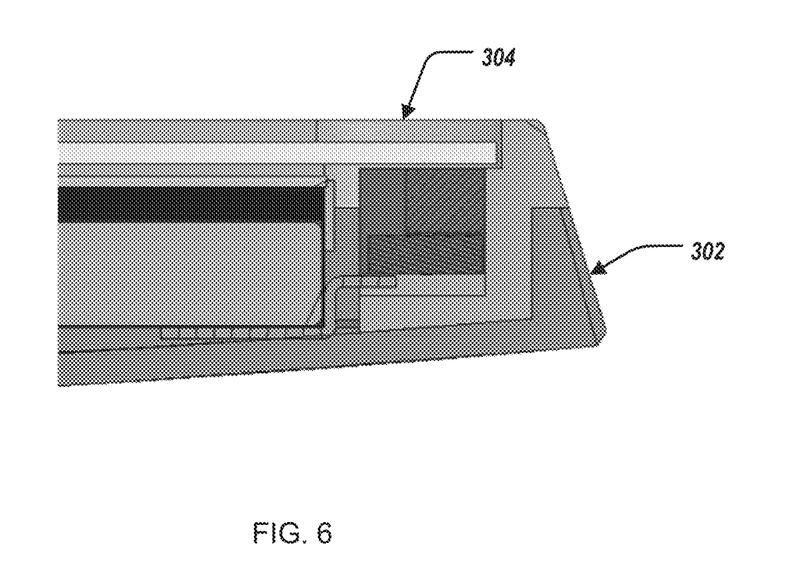

Furthermore, as the second end 260 of the display assembly 304 is rotated towards the display housing 302 and the retaining mechanism 306 is in the first state, the display assembly 304 is positioned within the display housing 302, as illustrated in FIG. 6. That is, the display housing 302 includes a cavity that can encompass or hold the display assembly 304, as shown in FIG. 6.

Figure 7:
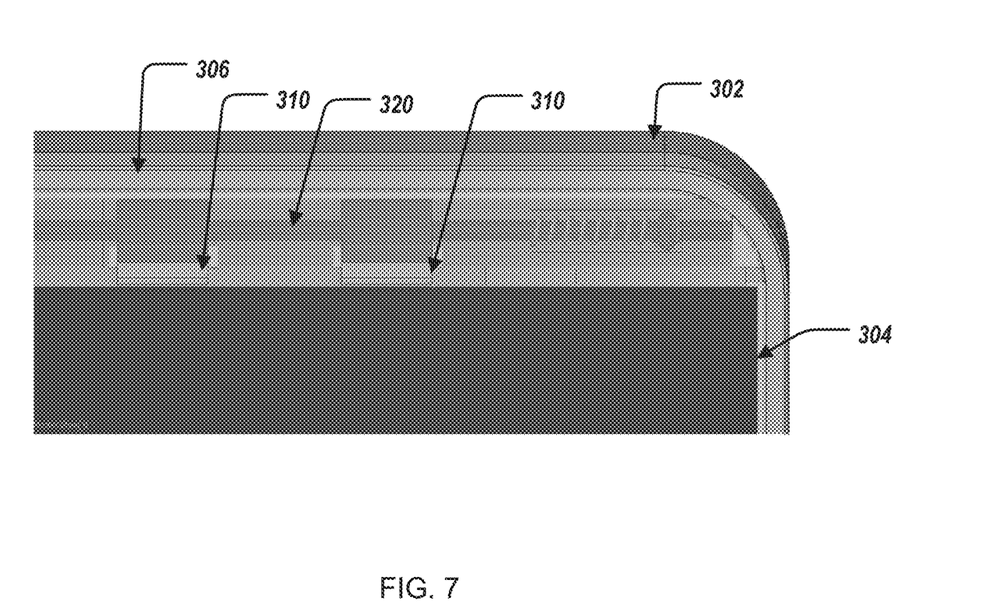
FIGS. 7, 8 illustrate the display assembly coupled to the display housing.

After rotating the display assembly 304 towards the display housing 302 and positioning the display assembly 304 within the display housing 302, the retaining mechanism 306 is positioned in a second (positional) state with respect to the bracket 310, as illustrated in FIG. 7. In some examples, the second state of the retaining mechanism 306 can include the tabs 322 of the pin 320 being in engaged with the tabs 314 of the bracket 310. In some examples, the second state of the retaining mechanism 306 can include the tabs 322 of the pin 320 being in superimposition with the tabs 314 of the bracket 310.

In some examples, the elastic mechanism, e.g., the spring 330, can facilitate transitioning the retaining mechanism 306 to the second state. Specifically, the spring 330 can be decompressed such that the retaining mechanism 306 is placed in the second state. In some examples, a user can access the retaining mechanism 306 via the pinhole 342. The user can initiate decompression of the spring 330 to transition the retaining mechanism 306 to the second state such that the tabs 322 of the pin 320 engage with the tabs 314 of the bracket 310. In other words, decompression of the spring 330 can shift the retaining mechanism 306 such that the tabs 322 of the pin 320 are engaged with the tabs 314 of the bracket 310.

Figure 8:
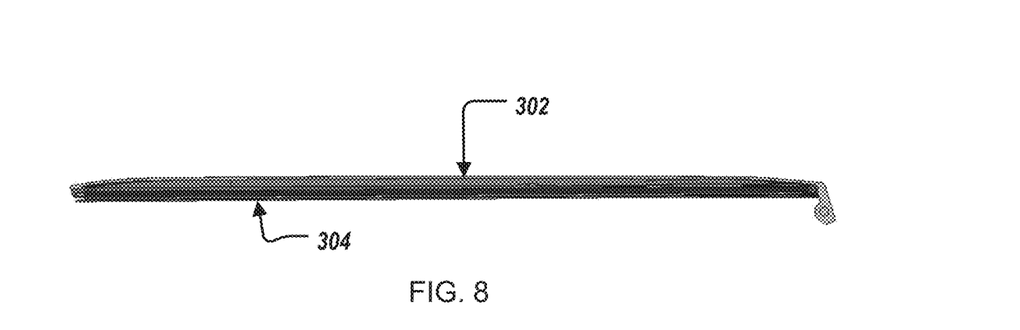

After engaging the tabs 314 of the bracket 310 with the tabs 322 of the pin 320, the display assembly 304 can be coupled to the display housing 302, as shown in FIG. 8.

Figure 9:
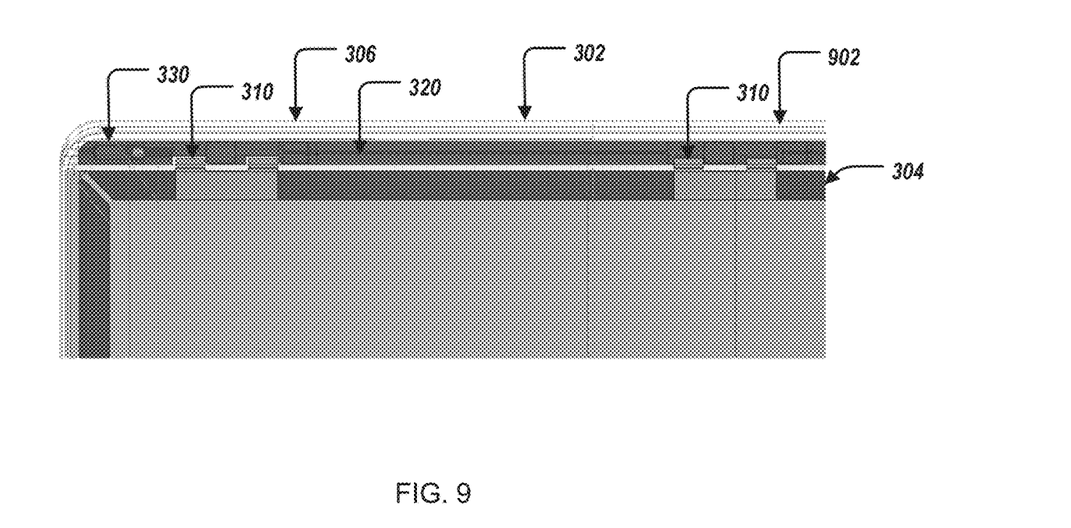
FIG. 9 illustrates the computing system including an additional retaining mechanism.

In some examples, after coupling the display assembly 304 with the display housing 302, the display assembly 304 can be decoupled from the display housing 302. Specifically, the retaining mechanism 306 is positioned in the first state, from the second state, with respect to the bracket 310. That is, the retaining mechanism 306 is positioned in the first state with respect to the bracket 310 from the second state, as shown in FIG. 9. In some examples, the elastic mechanism, e.g., the spring 330, can facilitate transitioning the retaining mechanism 306 to the first state from the second state. Specifically, the spring 330 can be compressed such that the retaining mechanism 306 is placed in the first state from the second state. The user can initiate compression of the spring 330 to transition the retaining mechanism 306 to the first state from the second state such that the tabs 322 of the pin 320 are clear of being in superimposition with the tabs 314 of the bracket 310. In other words, compression of the spring 330 can shift the retaining mechanism 306 such that the tabs 322 of the pin 320 are clear of being in superimposition with the tabs 314 of the bracket 310.

After the retaining mechanism 306 is positioned in the first state from the second state, the display assembly 304 is decoupled from the display housing 302. That is, the display assembly 304 is able to be removed from being included, or positioned within, the display housing 302. After decoupling the display assembly 304 from the display housing 302, the display assembly 304 is rotated away from the display housing 302. The second end 260 of the display assembly 304 is rotated away from the display housing 302 about the first end 250 of the display assembly 304. Specifically, the coupling elements of the display assembly 304 within the coupling cavities of the display housing 302 serve as an axis of rotation for rotating the second end 260 of the display assembly 304 away from the display housing 302. That is, the coupling elements of the display assembly 304 are able to rotate within the coupling cavities of the display housing 302 to facilitate rotation of the second end 260 of the display assembly 304 away from the display housing 302.

Furthermore, as the second end 260 of the display assembly 304 is rotated away from the display housing 302, the display assembly 304 is not positioned within the display housing 302, as illustrated in FIG. 5. That is, the cavity of the display housing 302 does not encompass or hold the display assembly 304.

Referring to FIG. 9, in some examples, the computing system 200 can include an additional retaining mechanism 902 that is coupled to the retaining mechanism 306 by the pin 320. The additional retaining mechanism 902 can be substantially the same as the retaining mechanism 306. In some examples, the additional retaining mechanism 902 can be positioned proximate to the edge of the first body 202*a*. In some examples, the additional retaining mechanism 902 can be positioned between the display housing 302 and the display assembly 304.

In some examples, the pin 320 can span a width of the display housing 302. That is, the pin 320 can be accessed via the pinhole 342 and a similar pinhole on the opposite side of the display housing 302. To that end, when the pin 320 is in the first state, the pin 320 can be engaged (e.g., accessed) from a first side of the display housing 302. That is, the pin 320 can be engaged such that the retaining mechanism 306 can be transitioned from the first state to the second state. The pin 320 can be engaged via the pinhole 342 to shift the retaining mechanism 306 such that the tabs 322 of the pin 320 are engaged with the tabs 314 of the bracket 310.

Similarly, when the pin 320 is in the second state, the pin 320 can be engaged (e.g., accessed) from a second side of the display housing 302, the second side opposite the first side. That is, the pin 320 can be engaged such that the retaining mechanism 306 can be transitioned from the second state to the first state. The pin 320 can be engaged via the additional pinhole (not shown) located on the second side of the display housing 302 to shift the retaining mechanism 306 such that the tabs 322 of the pin 320 are clear of being in superimposition with the tabs 314 of the bracket 310.

Figure 10:
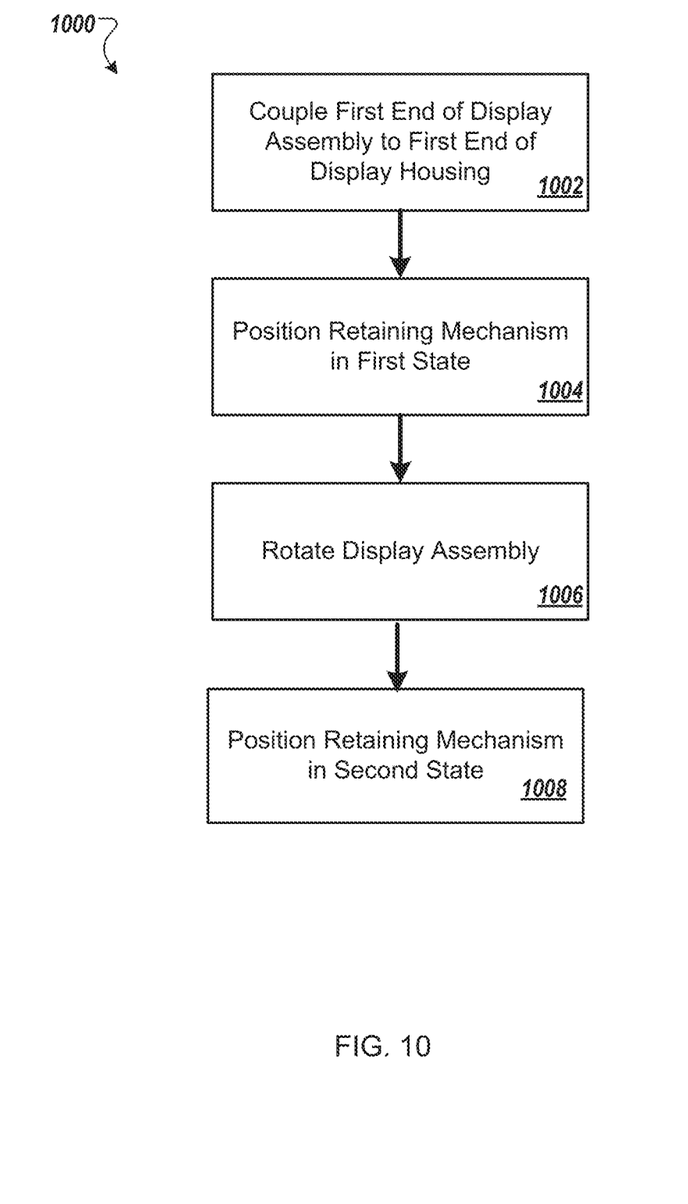
FIG. 10 illustrates a method of coupling the display assembly with the display housing.

FIG. 10 illustrates a flowchart depicting selected elements of an embodiment of a method 1000 for coupling a display assembly with a display housing of an information handling system. The method 1000 may be performed by the information handling system 200, the display housing 302, the display assembly 304, and/or the retaining mechanism 306 described herein with reference to FIGS. 1-9 and 11, or another information handling system. It is noted that certain operations described in method 1000 may be optional or may be rearranged in different embodiments.

The first end 250 of the display assembly 304 is coupled to the first end 252 of the display housing 302 (1002). The first end 250 of the display assembly 304 is proximate to the hinge assembly 204 of the computing system 200. The retaining mechanism 306 is positioned in a first state such that the tabs 322 that extend radially from the pin 320 of the retaining mechanism 306 are clear of being in superimposition with the tabs 314 extending from the bracket 310 of the display assembly 304 (1004). After positioning the retaining mechanism 306 in the first state, the display assembly 304 is rotated towards the display housing 302 such that the display assembly 304 is positioned within the display housing 302 (1006). After rotating the display assembly 304 towards the display housing 302, the retaining mechanism 306 is positioned in a second state such that the tabs 314 of the pin 320 engage the tabs 314 of the bracket 310 to couple the display assembly 304 to the display housing 302 (1008).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An information handling system, comprising:
   a display housing;
   a display assembly including a bracket, the bracket having tabs extending therefrom, the display assembly configured to be retained by the display housing;
   a translatable retaining mechanism including a pin having tabs extending radially from the pin, the retaining mechanism positioned at a first end of the display housing, the retaining mechanism configured to:
      when translated along a first direction to be positioned in a second physical state with respect to the bracket, the tabs of the pin of the retaining mechanism engage the tabs of the bracket such that the display assembly is coupled to the display housing to prevent rotation of the display assembly with respect to the display housing at a second end of the display housing opposite the first end of the display housing; and
      when translated along a second direction, opposite to the first direction, to be positioned in a first physical state with respect to the bracket, the tabs of the pin of the retaining mechanism disengage the tabs of the bracket such that the display assemble is decoupled from the display housing.

2. The information handling system of claim 1, further comprising:
   a first body;
   a second body; and
   a hinge assembly connecting the first body to the second body,
   wherein the first body includes the display housing, the display assembly, and the retaining mechanism, wherein the retaining mechanism is positioned proximate an edge of the first body opposite the hinge assembly.

3. The information handling system of claim 1, wherein the retaining mechanism is positioned between the display housing and the display assembly.

4. The information handling system of claim 1, wherein the retaining mechanism further includes an elastic mechanism, the elastic mechanism configured to transition the retaining mechanism to the second physical state when uncompressed and transition the retaining mechanism to the first physical state when compressed.

5. The information handling system of claim 4, wherein the elastic mechanism is a mechanical spring.

6. The information handling system of claim 4, wherein the elastic mechanism is deformable material.

7. The information handling system of claim 1, wherein the pin spans a width of the display housing such that:
   the pin is in the first physical state when the pin is engaged from a first side of the display housing; and
   the pin is in the second physical state when the pin is engaged from a second, opposite side of the display housing.

8. The information handling system of claim 1, further comprising an additional retaining mechanism.

9. A method of coupling a display assembly with a display housing of an information handling system, the method comprising:
   coupling a first end of the display assembly to a first end of the display housing, the first end of the display housing proximate to a hinge assembly of the information handling system;
   positioning a retaining mechanism at a second end of the display housing, the second end of the display housing opposite to the first end of the display housing;
   translating the retaining mechanism along a first direction to position the retaining mechanism in a first physical state such that tabs that extend radially from a pin of the retaining mechanism are decoupled from tabs extending from a bracket of the display assembly;
   after positioning the retaining mechanism in the first state, rotating the display assembly towards the display housing such that the display assembly is positioned within the display housing; and
   after rotating the display assembly towards the display housing, translating the retaining mechanism along a second direction, opposite to the first direction, to position the retaining mechanism in a second physical state such that the tabs of the pin engage the tabs of the bracket to couple the display assembly to the display housing to prevent rotation of the display assembly with respect to the display hosing at the first end of the display housing.

10. The method of claim 9, after translating the retaining mechanism along the second direction to position the retaining mechanism in the second physical state, further comprising:
   translating the retaining mechanism along the first direction to position in the first physical state, from the second physical state, such that the tabs that extend radially from the pin of the retaining mechanism are clear of being in superimposition with the tabs extending from the bracket of the display assembly;

after positioning the retaining mechanism in the second physical state, decoupling the display assembly from the display housing; and after decoupling the display assembly from the display housing, rotating the display assembly away from the display housing such that the display assembly is not positioned within the display housing.

11. The method of claim 9, wherein the retaining mechanism is positioned between the display housing and the display assembly.

12. The method of claim 9, further comprising:

compressing an elastic mechanism of the retaining mechanism to transition the retaining mechanism to the first physical state; and decompressing the elastic mechanism of the retaining mechanism to transition the retaining mechanism to the second physical state.

13. The method of claim 12, wherein the elastic mechanism is a mechanical spring.

14. The method of claim 12, wherein the elastic mechanism is deformable material.

15. The method of claim 12, wherein the pin spans a width of the display housing, the method further comprising:

engaging the pin at a first side of the display housing to place the pin in the first physical state; and engaging the pin at a second side of the display housing to place the pin the second physical state, the second side opposite the first side.

\* \* \* \* \*